(12) United States Patent
Ben Ami et al.

(10) Patent No.: US 10,075,855 B2
(45) Date of Patent: Sep. 11, 2018

(54) MOBILE NETWORK OPTIMIZATION (71) Applicant: Cisco Technology, Inc., San Jose, CA (US)

(72) Inventors: Alon Ben Ami, Gedera (IL); Shay Laslo-Amit, Kfar Saba (IL); Ziv Nuss, Tsur Yigal (IL)

(73) Assignee: Cisco Technology, Inc., San Jose, CA (US)

( * ) Notice: Subject to any disclaimer, the term of this patent is extended or adjusted under 35 U.S.C. 154(b) by 135 days.

(21) Appl. No.: 15/170,959

(22) Filed: Jun. 2, 2016

(65) Prior Publication Data
US 2016/0360539 A1 Dec. 8, 2016

Related U.S. Application Data

(60) Provisional application No. 62/170,711, filed on Jun. 4, 2015.

(51) Int. Cl.
*H04W 4/00* (2018.01)
*H04M 11/00* (2006.01)
*H04W 24/02* (2009.01)

(52) U.S. Cl.
CPC .................... *H04W 24/02* (2013.01)

(58) Field of Classification Search
CPC ...................................................... H04W 24/02
See application file for complete search history.

(56) References Cited

U.S. PATENT DOCUMENTS

| | | | |
|---|---|---|---|
| 9,113,353 | B1 | 8/2015 | Cotanis et al. |
| 9,258,719 | B2 | 2/2016 | Tarraf et al. |
| 2013/0262656 | A1 | 10/2013 | Cao et al. |
| 2013/0329588 | A1 | 12/2013 | Sangwan et al. |
| 2015/0078344 | A1* | 3/2015 | Futaki .................. H04W 24/02 370/332 |
| 2015/0189550 | A1* | 7/2015 | Harrang ................ H04W 28/08 455/405 |

* cited by examiner

*Primary Examiner* — Kiet Tang (57) ABSTRACT

In one embodiment, a method implemented on a computing device includes: classifying a current coverage and capacity (CCO) status according to a multiplicity of performance factors for a multiplicity of mobile network cells, clustering the mobile network cells into cell clusters based on at least the classifying and proximity of the mobile network cells to each other, based at least on the performance factors, identifying at least one problem cluster from among the cell clusters, identifying at least one underperforming master key performance indicator (MKPI) for the at least one problem cluster, and instructing the mobile network cells in the at least one problem cluster to perform at least one remedial action to address at least one of the performance factors to improve performance according to the MKPI.

22 Claims, 10 Drawing Sheets

| Action | Options | Feasibility | | | Mapping possible action to Use Case | | | | Highest level affected |
|---|---|---|---|---|---|---|---|---|---|
| | | H | N | E | DL Bad Coverage | UL Interference | DL Load | DL Interference | |
| Antenna tunings | Electrical Down Tilt | ✓ | ✓ | ✓ | ✓ | | ✓ | ✓ | Cluster |
| DL Ctrl channels power | CPICH | ✓ | ✓ | ✓ | ✓ | | ✓ | ✓ | Cluster |
| DL Ctrl channels power | FACE, PCH | ✓ | ✓ | ✓ | | | ✓ | | Cluster |
| DL Dedicated channel power | Power curve | ✓ | ✓ | ✓ | ✓ | | ✓ | ✓ | Cell |
| Channel Switching | Maximum DL bit rates | ✓ | ✓ | ✓ | | | ✓ | | Cell |
| Channel Switching | Inactivity Timer | ✓ | ✓ | ✓ | | | ✓ | | Cell |
| Codec management | SRB3.4/13.6 at call setup | ✓ | ✓ | ✓ | ✓ | | ✓ | ✓ | Cell |
| Codec management | AMR low to high rates at call setup | ✓ | N/A | ✓ | ✓ | ✓ | ✓ | ✓ | Cell |
| UL Noise Rise | Limiting Uplink to 2ms/10ms/DCH | ✓ | ✓ | ✓ | | ✓ | | | Cell |
| UL Noise Rise | EDCH Rot or/and Own load | | ✓ | ✓ | | ✓ | | | Cell |
| UL Noise Rise | Max HSUPA Rate | ✓ | ✓ | ✓ | | ✓ | | | Cell |
| UL Noise Rise | Limiting HSUPA Rate | ✓ | ✓ | ✓ | | | | | Cell |
| UL Noise Rise | 2ms/10ms TTI users | ✓ | ✓ | ✓ | | | | | Cell |
| UL Power Control | Power ramp closed loop | ✓ | ✓ | ✓ | | | | | Cell |
| Soft Handover Factor | RL add/removal | ✓ | ✓ | ✓ | | | ✓ | ✓ | Cluster |
| Mobility (active/idle) | Event 2D (like) | ✓ | ✓ | ✓ | ✓ | | ✓ | | Cell |
| Mobility (active/idle) | qQUAlmIN, qRxLevMin | ✓ | ✓ | ✓ | ✓ | | ✓ | | Cell |
| Mobility (active/idle) | qOffset2sn | ✓ | ✓ | ✓ | | | ✓ | | Cell |
| LAC/RAC/TAC | Size / Border management | Cross Domain | | | | | | | Cluster |
| LAC/RAC/TAC | Hysteresis in the borders | Cross Domain | | | | | | | Cluster |
| Paging | Paging occasions & frames | Cross Domain | | | | | | | Cluster |
| Corrective actions | Admissions (pwr, code, users) and more | ✓ | ✓ | ✓ | ✓ | | ✓ | ✓ | Cell |

MOBILE NETWORK OPTIMIZATION

RELATED APPLICATION INFORMATION

The present application claims the benefit of priority from US Provisional Patent Application, Ser. No. 62/170,711, filed on Jun. 4, 2015.

FIELD OF THE INVENTION

The present invention generally relates to optimizing mobile network performance and service.

BACKGROUND OF THE INVENTION

Self-optimizing networks (SONs) in the mobile space generally provide reactive relief on a per cell basis to remedy downlink issues. When a given cell exceeds a threshold failure rate for given period (e.g., too many dropped connections in an hour), the SON reconfigures one or more settings for the cell (e.g., transmission power is increased).

BRIEF DESCRIPTION OF THE DRAWINGS

The embodiments of the disclosure will be understood and appreciated more fully from the following detailed description, taken in conjunction with the drawings in which:

FIG. 5 A-C are alternative exemplary action timelines associated with steps of the process of FIG. 2; and FIGS. 6 A-C and 7 are graphs of observed performance of mobile network cells demarked to illustrate details of embodiments described herein.

DESCRIPTION OF EXAMPLE EMBODIMENTS

Overview

A method implemented on a computing device includes: classifying a current coverage and capacity (CCO) status according to a multiplicity of performance factors for a multiplicity of mobile network cells, clustering the mobile network cells into cell clusters based on at least the classifying and proximity of the mobile network cells to each other, based at least on the performance factors, identifying at least one problem cluster from among the cell clusters, identifying at least one underperforming master key performance indicator (MKPI) for the at least one problem cluster, and instructing the mobile network cells in the at least one problem cluster to perform at least one remedial action to address at least one of the performance factors to improve performance according to the MKPI.

Detailed Description of Example Embodiments

It will be appreciated by one of ordinary skill in the art that the adjustment of an individual cell's settings does not occur in a vacuum. Reconfiguring the settings for one particular cell may affect the performance of other cells, particularly those positioned in relative proximity to the reconfigured cell. The remedy for one cell may therefore prove to be problematic for one or more neighboring cells, thereby generating an oscillating effect: the treatment of one cell may incidentally serve to degrade the performance of a neighboring cell sufficiently to trigger the reconfiguration of its settings, which then impacts the performance of the first cell such that its settings are presumably reconfigured a second time, and so on.

In accordance with embodiments described herein, mobile network coverage and capacity may be improved by clustering cells in accordance with common radio issues and addressing key performance issues on a per cluster basis. It will be appreciated that by analyzing cell clusters, as opposed to individual cells, the identification of systemic issues may be facilitated, thereby enabling more timely and efficient treatment of these issues, as well reducing exposure to the oscillating effect described hereinabove.

Figure 1:
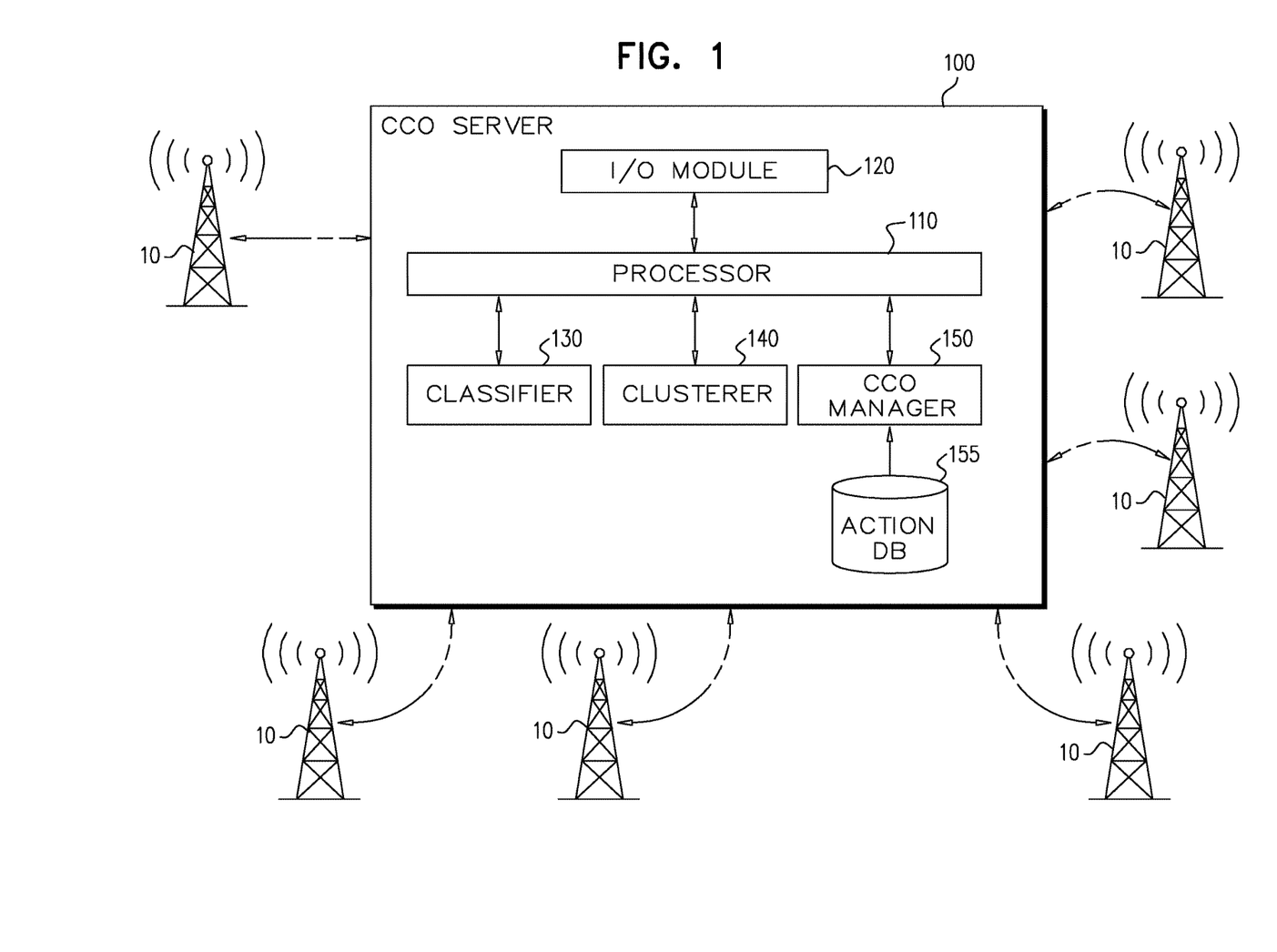
FIG. 1 is a partly pictorial, partly block diagram illustration of a coverage and capacity (CCO) server and associated mobile network cells, configured and operative in accordance with embodiments described herein.

Reference is now made to FIG. 1, which illustrates a coverage/capacity optimization (CCO) server 100 and associated mobile network cells 10, constructed and operative in accordance with embodiments described herein to optimize mobile network coverage and capacity. CCO server 100 is arrayed in communication with a multiplicity of mobile network cells 10 and comprises processor 110, I/O module 120, classifier 130, clusterer 140, CCO manager 150 and action database 155.

Processor 110 may be operative to execute instructions stored in a memory (not shown) in order to perform the herein described methods to optimize mobile network coverage and capacity. I/O module 120 may be any hardware or software component operative to use protocols such as are known in the art to communicate with mobile network cells 10. I/O module 120 may be implemented as a transceiver configured to transmit and receive wirelessly and/or via a wired connection. Classifier 130, clusterer 140 and CCO manager 150 may be implemented in either hardware or software and may be operative to be executed by processor 110 to perform at least the methods described herein for optimizing mobile network coverage and capacity.

Figure 2:
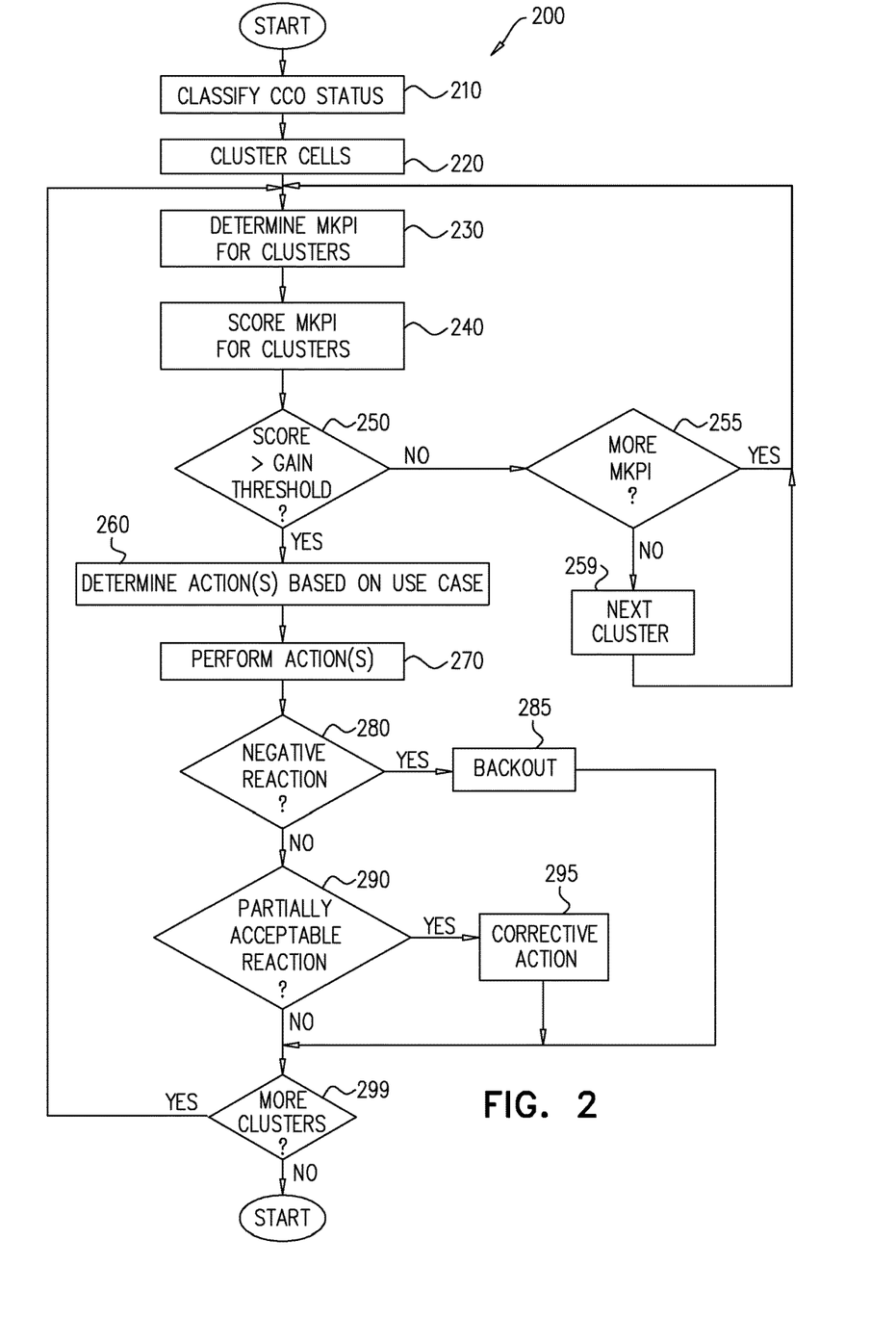
FIG. 2 is a flowchart of a process to be performed by the CCO server of FIG. 1.

Reference is now made to FIG. 2 which illustrates a CCO process 200 to be performed by CCO manager 150. CCO manager 150 invokes classifier 130 to classify (step 210) a current CCO status for each mobile network cell 10 in the coverage area of CCO server 100. It will be appreciated by one of ordinary skill in the art that depending on design choices, a given mobile network may be configured with more than one CCO server 100, where each mobile network cell 10 is assigned to one CCO server 100.

Figure 3:
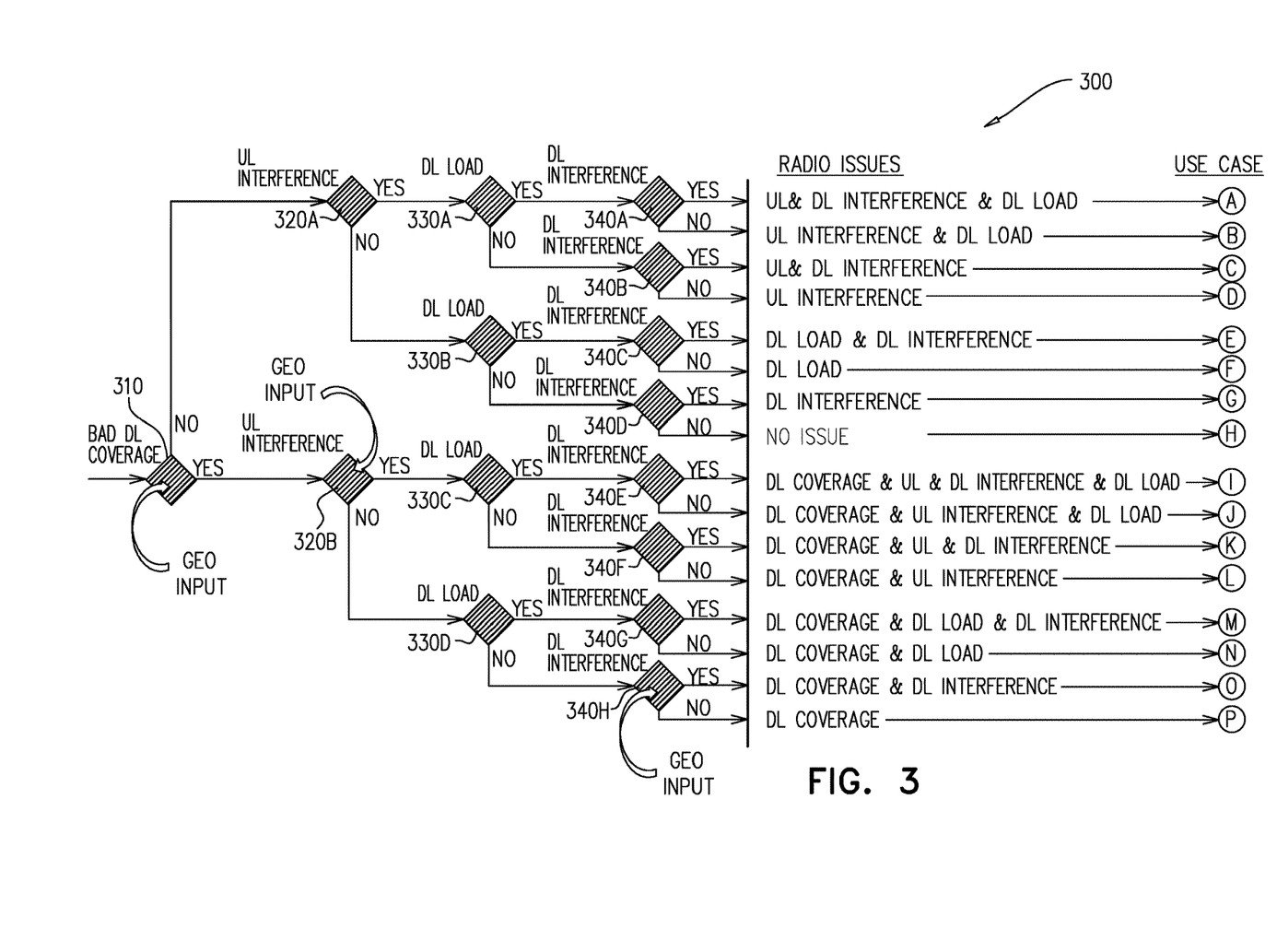
FIG. 3 is an exemplary CCO status classification tree to be used by one of the steps of the process of FIG. 2.

Reference is now also made to FIG. 3 which illustrates an exemplary CCO status classification tree 300 that is used by classifier 130 to classify a current performance state for each of the mobile network cells 10 in the target population. Each of the mobile network cells 10 is classified in accordance with data received via I/O module 120 on CCO server 100. The data may be provided by system components on mobile network cells 10 and/or provided via "crowdsourcing" of the mobile communications devices using mobile network cells 10.

As depicted in FIG. 3, CCO status classification tree 300 addresses possible combinations of coverage and/or capacity issues as characterized by uplink/downlink interference to classify the current status of each mobile network cell in terms of sixteen possible use cases. It will be appreciated that in some embodiments classification may employ a different combination of issues to classify a current status. CCO status classification tree 300 illustrates how a current status for each of four performance factors may be assessed by classifier 130 to determine a relevant use case for a given mobile network cell 10.

The downlink coverage for a mobile network cell 10 is assessed (step 310) in terms of a definable threshold, such as, for example, whether an observed received signal code power (RSCP) is less than or equal to −110 dBm. The mobile network cell 10 is then assessed in terms of a definable threshold for uplink interference (step 320A or 320B), for example, whether an observed received signal strength indication (RSSI) is greater than or equal to −97 dBm. It will be appreciated by one of ordinary skill in the art that the assessment performed by classifier 130 at steps 320A and 320B may be generally the same according to the same definable threshold; the only material difference between steps 320A and 320B may be a function of the previous assessment at step 310; i.e., if step 310 indicates that downlink coverage is unsatisfactory, then step 320A may be performed; otherwise, step 320B may be performed.

In similar fashion, each mobile network cell 10 may then be assessed in terms of a definable threshold for downlink load (steps 330A-D), for example, whether download utilization exceeds 80%. Each mobile network cell 10 may then be assessed in terms of a definable threshold for download interference (steps 340A-H), for example, whether RSCP exceeds 100 dBm while energy per chip/noise spectral density (Ec/No) is less than 13. Handovers to other radio access technologies (RATs) may also be indicative of download interference. It will be appreciated that there are sixteen possible combinations of results from the performance of steps 310, 320, 330 and 340. Each of these combinations may define the characteristics of a use case representing a current CCO status for a given mobile network cell 10.

For example, as depicted in CCO status classification tree 300, if a series of negative results is received in steps 310, 320A, 330B and 340D, the current CCO status may be classified as use case "H: no issue"; i.e., the indicated mobile network cell 10 may be assumed to be working properly. Conversely, if a series of positive results is received in steps 310, 320B, 320C and 340E, the current CCO status may be classified as use case "I: DL coverage & UL & DL Interference and DL load"; i.e., the indicated mobile network cell 10 may be assumed to be suffering from issues with all four of the assessed factors: downlink coverage, uplink interference, downlink load and downlink interference. It will be appreciated that the other use cases may indicate less extreme statuses.

Returning to FIG. 2, CCO manager 150 invokes clusterer 140 to cluster (step 220) mobile network cells 10 in clusters based at least on physical neighboring proximity (i.e., that the combined coverage areas of mobile network cells 10 in a given cluster form a continuous geographic coverage area) and their use cases per step 210. In accordance with embodiments described herein, clusterer 140 may be configured to include a surrounding "envelope" of mobile network cells 10 around a core of mobile network cells 10 with a common use case. In such manner, it may be possible to detect and fix issues caused in neighboring mobile network cells 10 that may be caused by remedial actions necessitated by a current status for mobile network cells 10 in the core of the cluster. It will be appreciated by a person of ordinary skill in the art, that in such manner, mobile network cells 10 may be included in more than one cluster; i.e., in a "primary cluster", as well as in the envelope of one or more "secondary clusters".

It will be appreciated by one of ordinary skill in the art that not all of the mobile network cells 10 in a given cluster may necessarily have the same exact use case. For example, as depicted in FIG. 3, use case "M" may differ from use case "N" in that use case "M" includes downlink interference whereas use case "N" does not. However, mobile network cells 10 with use case "M" may still potentially be clustered with mobile network cells 10 with use case "N" based on the commonality of the other relevant factors, namely downlink coverage, and uplink/downlink interference.

CCO manager 150 may determine (step 230) a master key performance indicator (MKPI) for the cluster. The MKPI may be determined as a function of the use cases of the individual mobile network cells 10 in the cluster. CCO manager 150 may then score (step 240) the determined MKPI in terms of the potential gain in coverage and/or capacity that may be realized if the situation was reversed. If the score is greater than a definable threshold (step 250) the MKPI may be used for further processing of the cluster. Otherwise, if other MKPI exist for the cluster (step 255), steps 230-250 may be repeated for an alternative MKPI. If there are no more relevant MKPI to be scored, the cluster may be discarded and the next cluster processed (step 259); i.e., CCO manager 150 may determine that in terms of cost/benefit it may not be worthwhile to attempt to optimize the cluster. The MKPI may be selected from among any suitable key performance indicator (KPI) known in the art, such as, for example, dropped call rates, hand over success/failure rates, call setup success/failure rates, etc. that are commonly used to assess retainability, accessibility, mobility, quality of experience, etc. It will be appreciated by one of ordinary skill in the art that clusters with use case H, i.e., "no issue" may flow through to step 259 without further processing.

Figure 4:
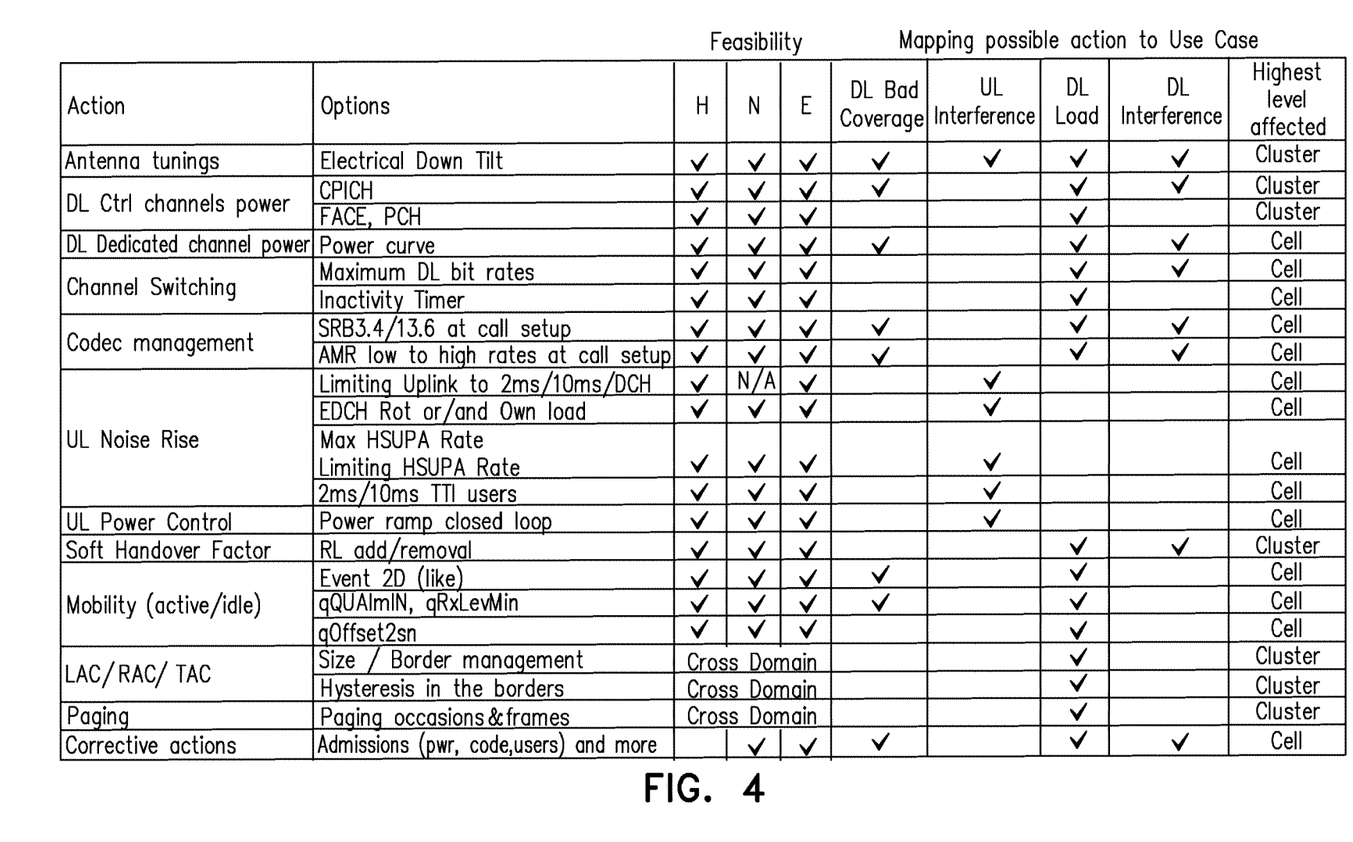
FIG. 4 is an exemplary table of key performance indicator remedies to be used by one of the steps of the process of FIG. 2.

CCO manager 150 may determine (step 260) remedial actions to be performed based at least in part on the MKPI of each cluster. It will be appreciated by one of ordinary skill in the art that there may be more than one potential cause for a given issue in a use case. Reference is now made briefly to FIG. 4 which is a table of an exemplary series of available remedial actions and options mapped to use case factors. As depicted in FIG. 4, each of the four assessed factors may be associated with multiple possible remedial actions. It will be appreciated by one of ordinary skill in the art that the table is based on current vendor releases. The feasibility of each particular option may be indicated for each of three leading radio access network (RAN) vendors: Huawei (H), Nokia (N) and Ericsson (E) at the time of this application. Where the feasibility is indicated as "Cross Domain", core network implementations may also be available.

Returning to FIG. 2, CCO manager 150 may perform (step 270) one or more remedial actions for the mobile network cells 10 of the cluster. For example, as per the exemplary series of FIG. 4, for use cases including uplink interference, CCO manager 150 may employ one or more options to adjust uplink noise for mobile network cells 10 in the cluster. Similarly, CCO manager 150 may adjust the attitude of the antenna for mobile network cells 10 in the cluster. The options selected for action by CCO manager 150 may be determined at least in part with regard to the level of impact desired, i.e., impact on individual mobile network cells 10 and/or on a cluster. In the absence of a restriction that specifically requires cell level action, the actions performed in step 270 may generally be associated with cluster level impact. However, as will be described hereinbelow with respect to step 295, corrective actions may be performed as cell level actions unless cross domain actions are performed which by definition impact on the cluster level. It will be appreciated by persons of ordinary skill in the art that CCO manager 150 may perform step 270 by sending instructions via I/O module 120 to mobile network cells 10 in the cluster.

CCO manager 150 may monitor the performance of the cluster's cells to determine the efficacy of the remedial action(s). If CCO manager 150 detects a negative reaction, i.e., the overall effect of the remedial action(s) is unsatisfactory as determined by a definable threshold (step 280), CCO manager 150 may back out (step 285) the remedial action(s) to undo the remedial action(s). CCO manager 150 may also check for a partially acceptable reaction, where the remedial action(s) was/were at least in part successful in improving performance, but at least one mobile network cell 10 in the cluster may have been adversely affected. For example, in a cluster with downlink (DL) coverage issues, CCO manager 150 may select to increase antennae tilts. As a result, the interference to envelope cells may increase and drop level consequently increase for those cells 10 in the envelope.

If so (step 290), CCO manager 150 may perform (step 295) a corrective action to offset the adverse effect on the affected cells without backing out the original remedial action(s) on the entire cluster. As per the previous example, CCO manager 150 may increase the power curve (power per radio access bearer—RAB) for the envelope cells to offset the increased interference, thereby reducing their drop levels. If there are more clusters to process (step 299), processing control may return to step 230 for the next cluster. Otherwise process 200 may end. It will be appreciated by one of ordinary skill in the art that process 200 may be performed by CCO manager 150 on a periodic basis and/or on demand.

Figure 5A:
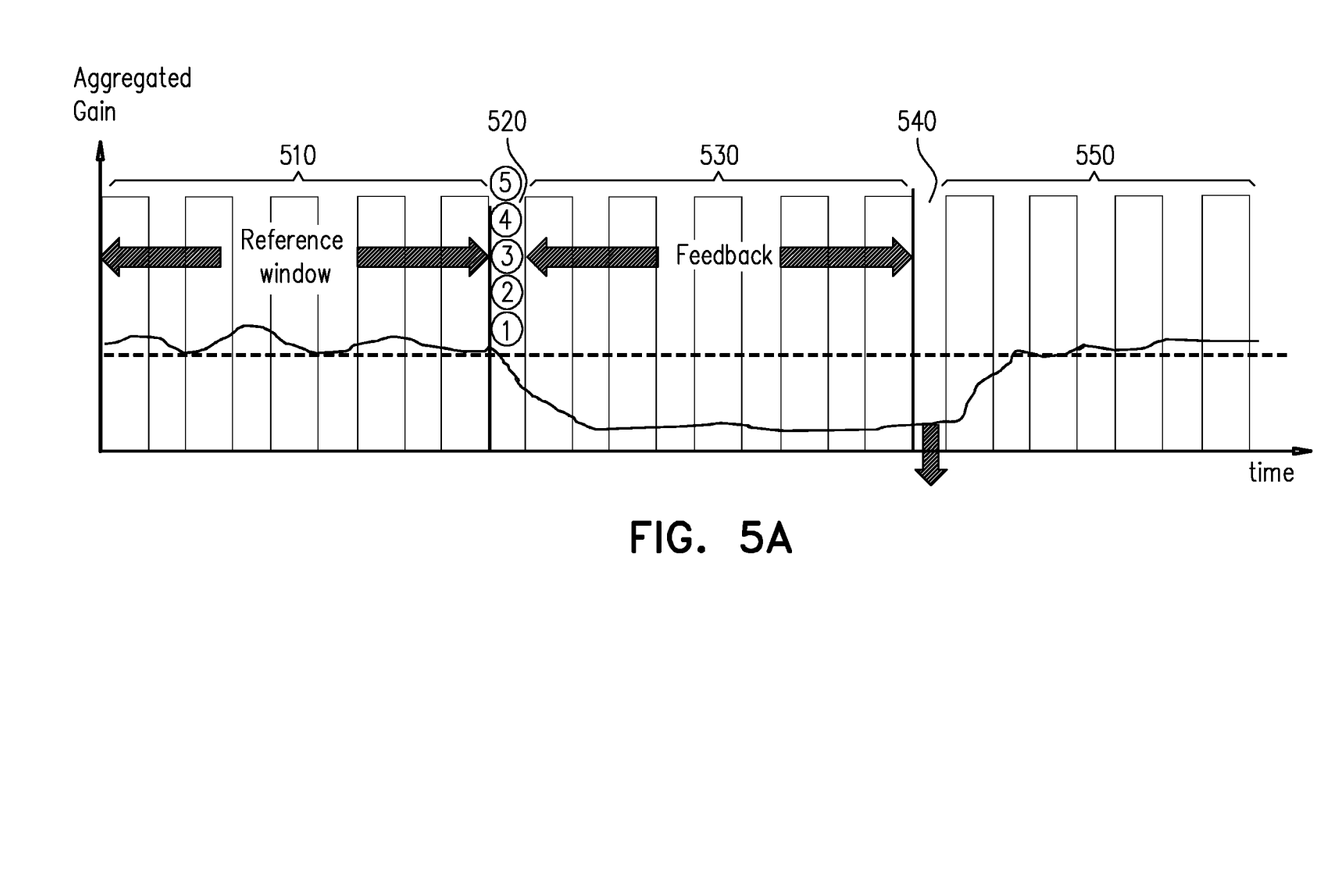

Reference is now made to FIG. 5A which illustrates an exemplary action timeline for monitoring the effects of actions performed in step 270. It will be appreciated by one of ordinary skill in the art that given that there may be multiple potential remedial actions to perform to remedy a given issue, there may be different methods for prioritizing and/or ordering the actions to be performed and/or back out by CCO manager 150.

In accordance with the embodiment of FIG. 5A, the performance of a given mobile network cell 10 and/or cluster may be monitored during reference window 510. The monitored performance may serve as a baseline according to which the effects of the remedial actions of step 270 (FIG. 2) may be assessed. For example, in FIG. 5A the monitored performance may be indicated by the solid line, and the baseline performance level may be indicated by the dotted line.

In accordance with an exemplary embodiment, five remedial actions may be identified for the cluster, each of which is performed at generally the same point in time, action point 520. CCO manager 150 may then monitor the combined effect of the five remedial actions on the performance during feedback window 530. If, as depicted in FIG. 5A, monitored performance during feedback window 530 drops below the baseline performance level, CCO manager 150 may back out all of the remedial actions at back out point 540. CCO manager 150 may monitor the effect of the back out during back out window 550.

Figure 5B:
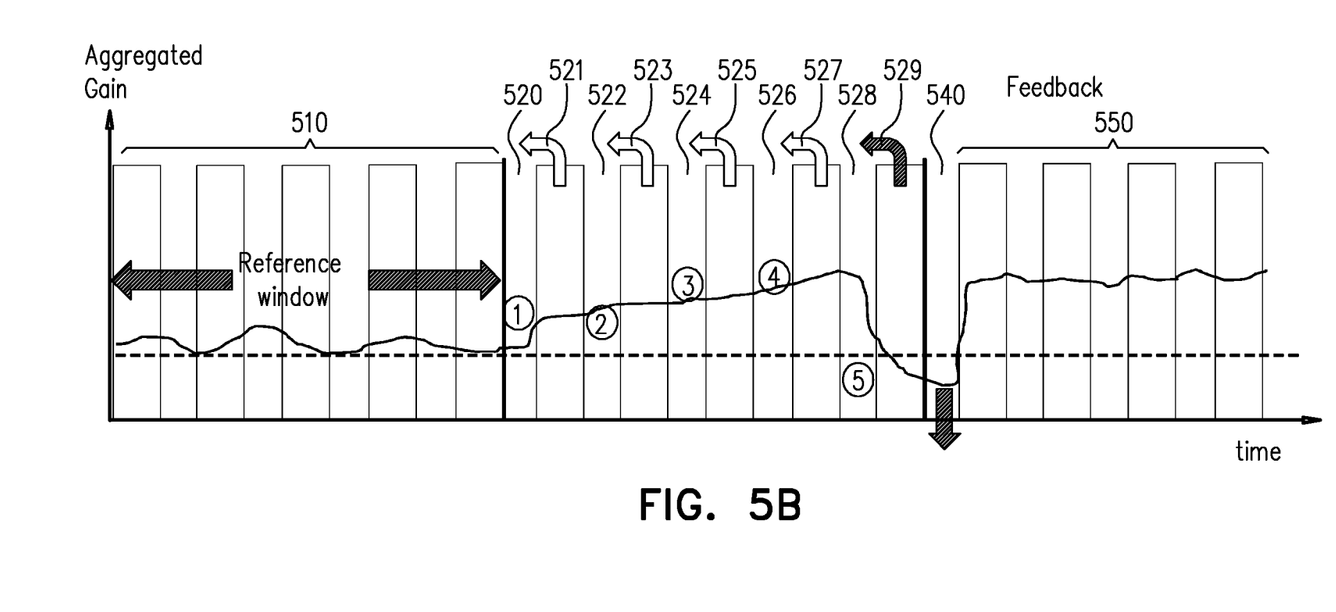

Reference is now made to FIG. 5B which illustrates an alternative exemplary action timeline for monitoring the effects of actions performed in step 270. As described with reference to the embodiment of FIG. 5A, a baseline performance level may be determined based on monitoring during reference widow 510. However, instead of performing all of the remedial actions at generally the same, CCO manager 150 may be alternatively configured to perform each remedial action separately.

For example, remedial action #1 may be performed at action point 520. CCO manager 150 may then monitor performance during feedback window 521 to assess the effect of remedial action #1. Similarly, remedial actions #2-5 may be performed separately at action points 522, 524, 526 and 528, and their effects monitored during feedback windows 523, 525, 527 and 529 respectively. If, as depicted in FIG. 5B, monitored performance during feedback window 530 drops after a specific remedial action such as during feedback window 529 (i.e., following performance of remedial action #5), CCO manager 150 may back out the specific remedial action which was performed immediately prior to the monitored drop, i.e., remedial action #5, during back out point 540. CCO manager 150 may monitor the effect of the back out during back out window 550.

Figure 5C:
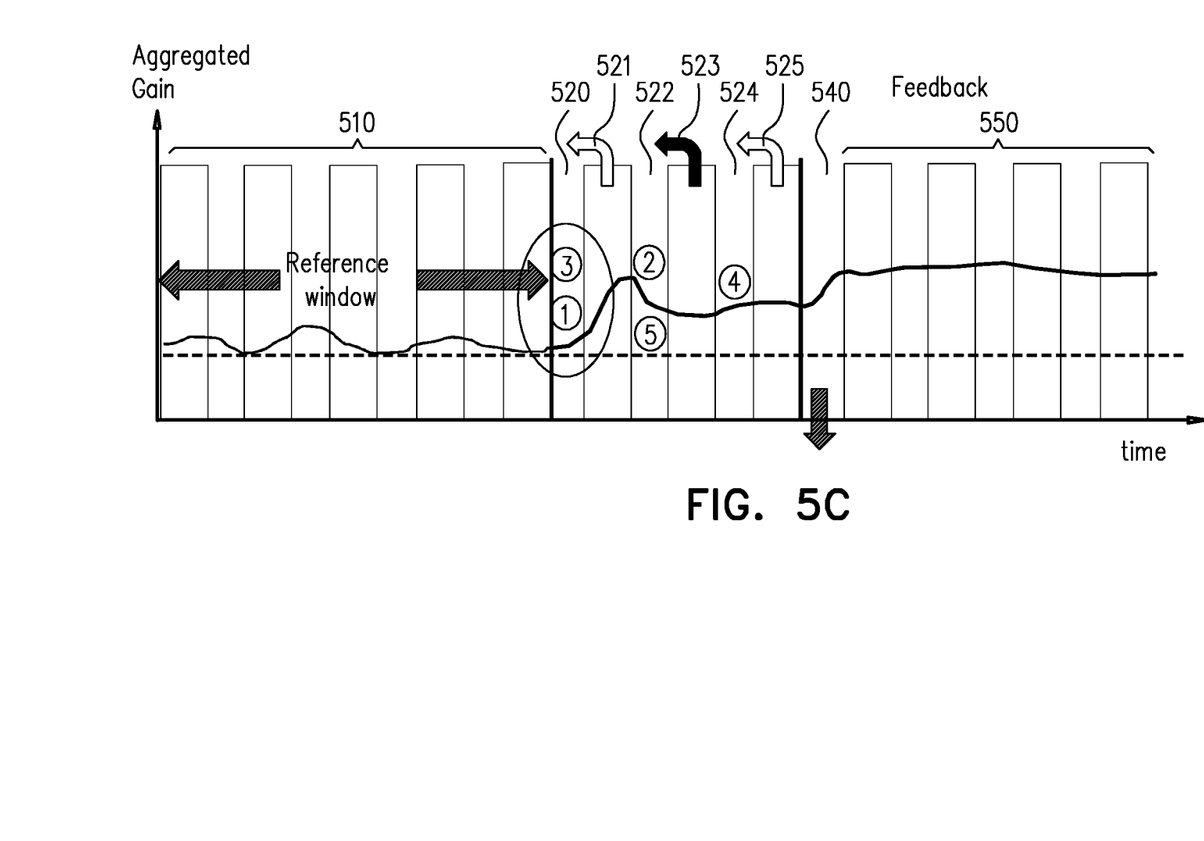

Reference is now made to FIG. 5C which illustrates yet another alternative exemplary action timeline for monitoring the effects of actions performed in step 270. As described with reference to the previous embodiments, a baseline performance level may be determined based on monitoring during reference widow 510. However, instead of performing all of the remedial actions either individually or at the same time, CCO manager 150 may be alternatively configured to perform two or more remedial actions at generally the same time, without necessarily doing all of the remedial actions at the same time.

For example, remedial actions #1 and #3 may be performed at generally the same time at action point 520. CCO manager 150 may then monitor performance during feedback window 521 to assess the effect of remedial actions #1 and #3. Similarly, remedial actions #2 and #5 may be performed generally together at action points 522, and their effects monitored during feedback window 523. Remedial action #4 may then be performed at action point 524 and its effect monitored during feedback window 525. If, as depicted in FIG. 5B, monitored performance during feedback window 524 drops, remedial actions #2 and #5 may be backed out at back out point 540.

It will be appreciated by one of ordinary skill in the art that it may be problematic to accurately detect and/or quantify the effects of interference on the performance of a mobile network cell 10, particularly as at least some, but not necessarily all, of such inference may be emanate from mobile network cell 10 itself; i.e., the source of the interference may be internal, external or both. In accordance with embodiments described herein, interference and/or its source may be detected/deduced per observation of one or more MKPI.

Figure 6A:
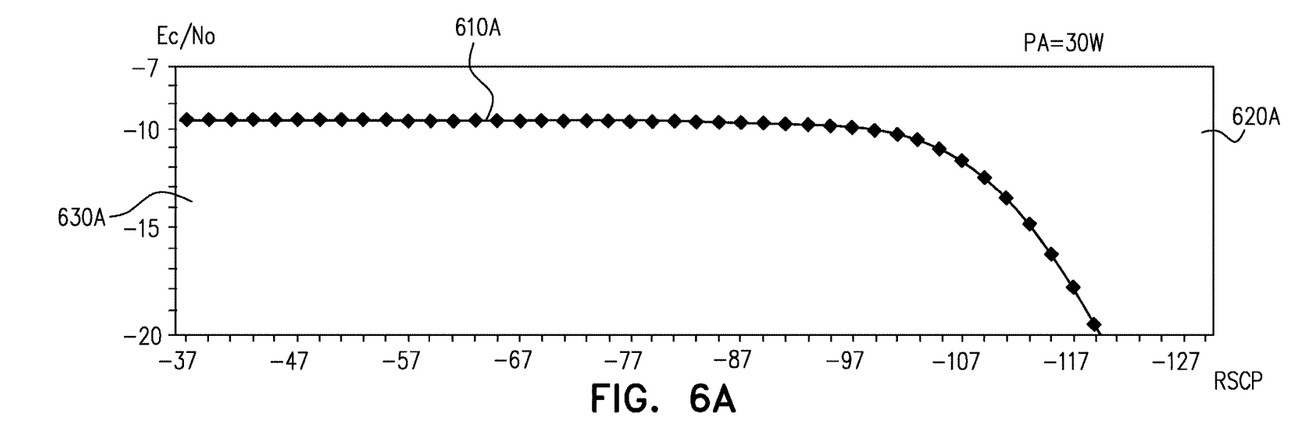
Figure 6B:
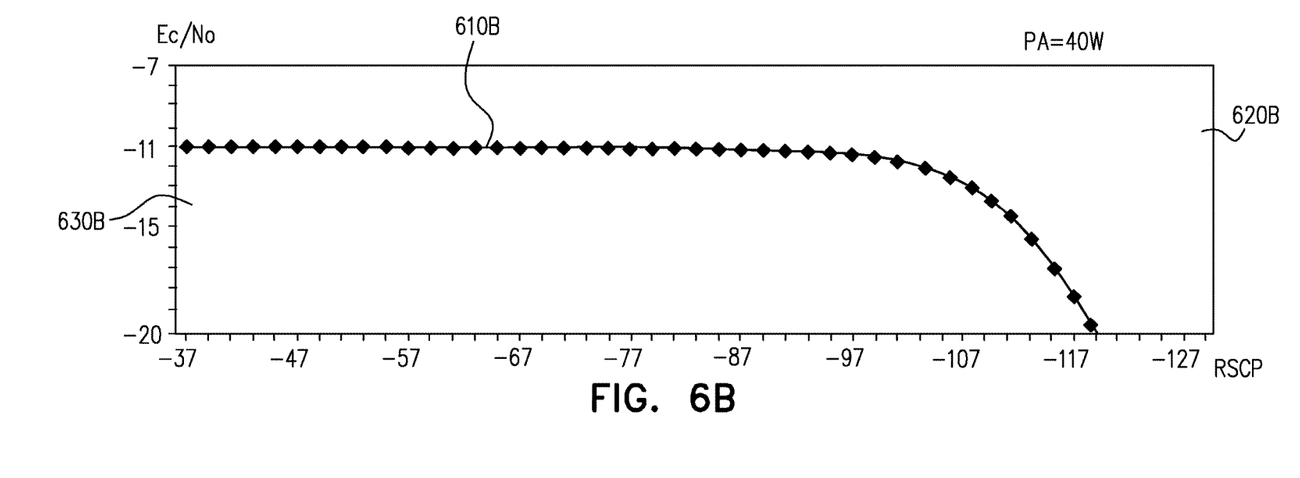
Figure 6C:
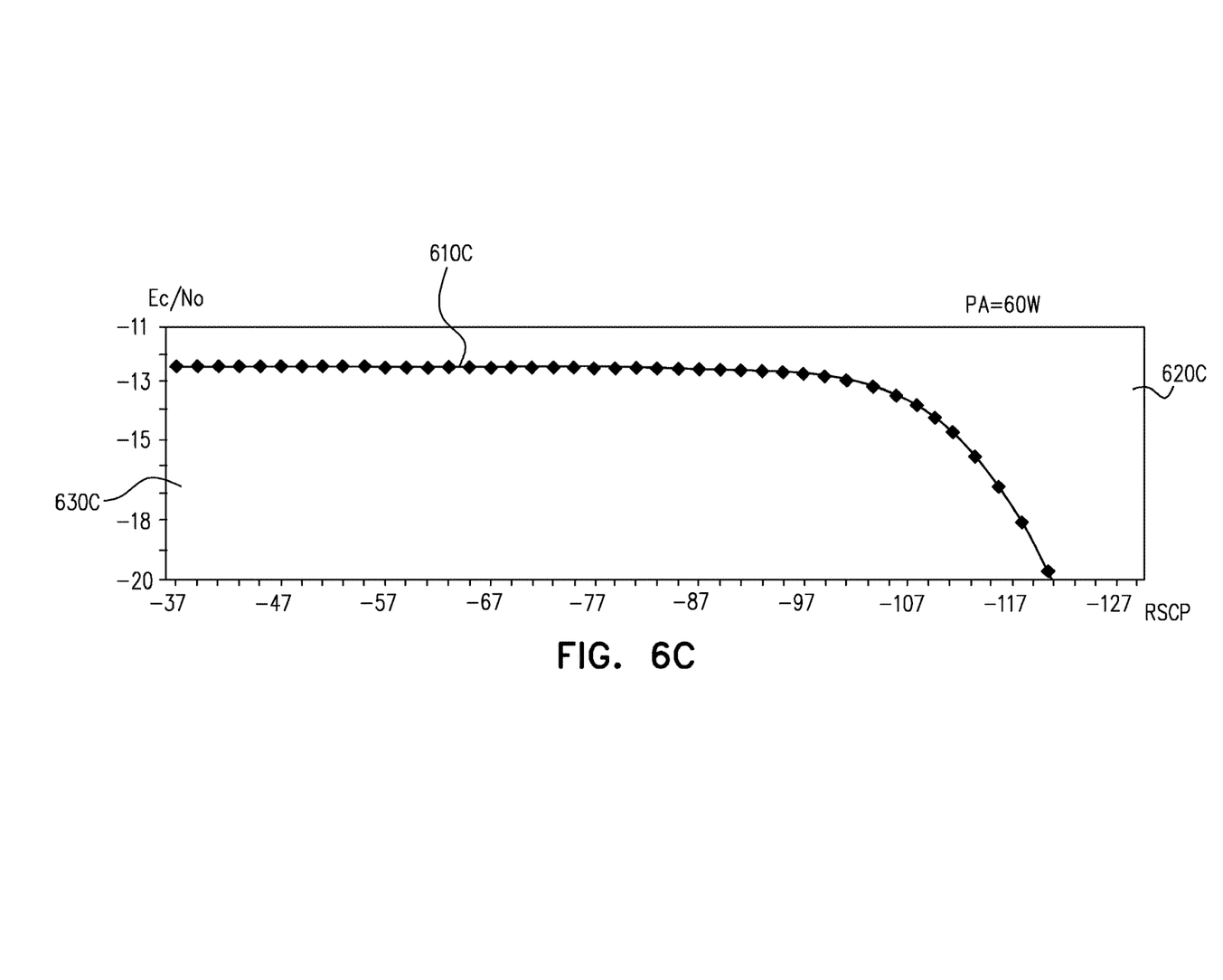

Reference is now made to FIGS. 6A-C which are graphs of observed Ec/No/RSCP rates for mobile network cells 10 experiencing 100% load under different power settings: 30 W, 40 W and 60 W, respectively, without external interference. Lines 610 A-C may therefore illustrate a baseline expected relationship between Ec/No and RSCP for each respective power setting. It will be appreciated that in a production environment the baseline for may differ somewhat for each mobile network cell 10, due to differences in topology, urban/rural environment, weather, model numbers, equipment degradation, etc. However, it will be appreciated that a baseline may derived for a given mobile network cell 10 or group of cells in a generally similar manner.

Using lines 610 A-C as a baseline, an observation "above" lines 610 A-C, i.e., in areas 620 A-C, would therefore indicate performance exceeding expectations, presumably enabled by unusual atmospheric conditions or a paradigm shift in the specific environment. An observation in areas 630 A-C would indicate degradation of performance that could not be attributed to internally sourced interference, since that would be accounted for within the framework of the established baseline. An Ec/No/RSCP in area 620 A-C may therefore be used by classifier 130 to detect downlink interference. It will be appreciated by one of ordinary skill in the art that baseline expectations may also be determined for loads of less than 100%, either by observation and/or extrapolation based on pre-existing observations.

Figure 7:
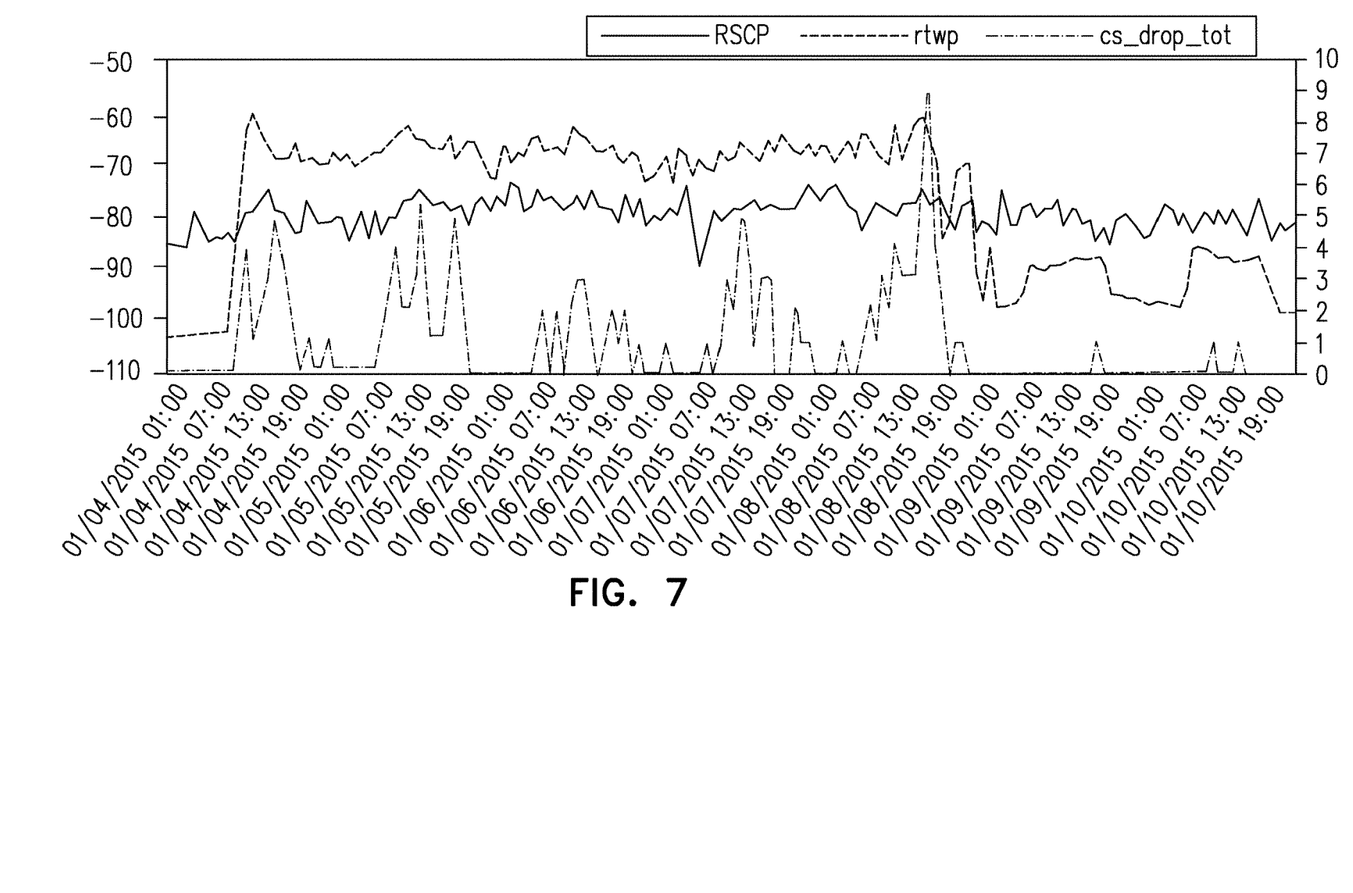

Reference is now made to FIG. 7 which is a graph of observed RSCP, received total wideband power (RTWP), and total drops over time in an exemplary mobile network cell 10. It will be appreciated by one of ordinary skill in the art that over time while there may be little or no correlation between RSCP and drops, there may be an observable correlation between RTWP and drops such that it may be reasonably inferred that a significant increase/decrease in RTWP may generally tend to result in a corresponding decrease/increase in drops. In accordance with embodiments described herein, an observed change in RTWP in tandem with relatively static RSCP may be a function of uplink interference. As interference increases, RTWP may decrease and drops may increase; while interference decreases, RTWP may increase and drops may decrease. Accordingly, classifier 130 may use RTWP observations as a proxy indicator for the detection of uplink interference.

Using the methods described herein, classifier 130 may be configured to autonomously perform root cause analysis to identify whether degraded performance indicated by a decrease in RTWP or RSCP is due to uplink or downlink causes. Furthermore, classifier 130 may determine whether the degraded performance correlates more with internal interference, load issues of the mobile network cell 10 with degraded performance, load issues associated with other mobile network cells 10, or even external network interferences. It will be appreciated by one of ordinary skill in the art that CCO manager 150 may then determine remedial actions to be performed accordingly, for example, at least according to mapping of possible actions to use case presented in FIG. 4.

It is appreciated that software components of the embodiments of the disclosure may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the disclosure.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable subcombination.

It will be appreciated by persons skilled in the art that the embodiments of the disclosure are not limited by what has been particularly shown and described hereinabove. Rather the scope of the embodiments of the disclosure is defined by the appended claims and equivalents thereof:

What is claimed is:

1. A method implemented on a computing device, the method comprising:
classifying a current coverage and capacity (CCO) status according to a multiplicity of performance factors for each of a multiplicity of mobile network cells, wherein said multiplicity of performance factors includes at least one of uplink interference or downlink interference;
clustering said mobile network cells into cell clusters based on at least said classifying and proximity of said mobile network cells to each other;
based at least on said performance factors, identifying at least one problem cluster from among said cell clusters;
identifying at least one underperforming master key performance indicator (MKPI) for said at least one problem cluster; and
instructing said mobile network cells in said at least one problem cluster to perform at least one remedial action to address at least one of said performance factors to improve performance according to said at least one underperforming MKPI.

2. The method according to claim 1 and also comprising:
monitoring said at least one underperforming MKPI in said mobile network cells in said at least one problem cluster after performance of said at least one remedial action; and
upon determining according to said monitoring that said at least one underperforming MKPI falls below a definable back out threshold, instructing said mobile network cells in said problem cluster to back out said at least one remedial action.

3. The method according to claim 2 and also comprising:
upon determining according to said monitoring that said at least one underperforming MKPI falls below a definable corrective action threshold, instructing at least one of said mobile network cells in said at least one problem cluster to perform at least one corrective action.

4. The method according to claim 2 and wherein:
said at least one remedial action is at least two remedial actions;
said instructing comprises instructing said mobile network cells to perform each of said at least two remedial actions separately according to a schedule; and
said monitoring comprises:
defining a feedback window for each of said at least two remedial actions according to said schedule,
monitoring said at least one underperforming MKPI in said mobile network cells in said at least one problem cluster in each said feedback window after performance of each of said at least two remedial actions, and
for each said feedback window, upon determining that said at least one underperforming MKPI falls below a definable back out threshold, instructing said mobile network cells in said problem cluster to back out a most recently performed remedial action from said at least two remedial actions.

5. The method according to claim 2 and wherein:
said at least one remedial action is at least three remedial actions;
grouping said at least three remedial actions into at least two groups of remedial actions;

said instructing comprises instructing said mobile network cells to perform each of said at least two groups of remedial actions separately according to a schedule; and said monitoring comprises:
defining a feedback window for each of said at least two groups of remedial actions according to said schedule,
monitoring said at least one underperforming MKPI in said mobile network cells in said at least one problem cluster in each said feedback window after performance of each of said at least two groups of remedial actions, and
for each said feedback window, upon determining that said at least one underperforming MKPI falls below a definable back out threshold, instructing said mobile network cells in said problem cluster to back out a most recently performed group of remedial actions from said at least two groups of remedial actions.

6. The method according to claim 1 and wherein:
said multiplicity of performance factors also includes at least one of downlink coverage or downlink load.

7. The method according to claim 6 and wherein said downlink coverage is assessed in terms of whether observed received signal code power (RSCP) is less than or equal to a definable threshold.

8. The method according to claim 1 and wherein said uplink interference is assessed in terms of whether an observed received signal strength indication (RSSI) is greater than or equal to a definable threshold.

9. The method according to claim 6 and wherein said downlink load is assessed in terms of whether downlink load utilization exceeds a definable threshold.

10. The method according to claim 1 and wherein said downlink interference is assessed in terms of whether received signal code power (RSCP) exceeds a first definable threshold, while energy per chip/noise spectral density (Ec/No) is less than a definable threshold.

11. The method according to claim 6 and wherein said clustering comprises:
defining a core cluster, wherein each of said mobile network cells in said core cluster is in neighboring proximity with at least another of said mobile network cells with at least one of said performance factors in common.

12. The method according to claim 11 and wherein at least another performance factor of said performance factors is not in common.

13. The method according to claim 11 and wherein said clustering further comprises:
defining a cluster envelope wherein said mobile network cells in said cluster envelope are in neighboring proximity to said core cluster; and
forming said cell cluster from said core cluster and said cluster envelope.

14. The method according to claim 6 and wherein said at least one remedial action to address said downlink coverage performance factor is to adjust at least one of: antenna tunings, downlink dedicated channel power, codec management, or active/idle mobility settings.

15. The method according to claim 1 and wherein said at least one remedial action to address said uplink interference performance factor is to adjust at least one of: antenna tunings, uplink noise rise, or uplink power control.

16. The method according to claim 6 and wherein said at least one remedial action to address said downlink load performance factor is to adjust at least one of: antenna tunings, downlink control channels power, downlink dedicated channel power, channel switching, codec management, soft handover factors, active/idle mobility settings, tracking areas, or paging settings.

17. The method according to claim 1 and wherein said at least one remedial action to address said downlink interference performance factor is to adjust at least one of: antenna tunings, downlink control channels power, downlink dedicated channel power, channel switching, codec management, or soft handover factors.

18. The method according to claim 3 and wherein said at least one corrective action is to increase the power curve (power per radio access bearer RAB) for said at least one of said mobile network cells in said at least one problem cluster.

19. A system implemented on a computing device comprising:
means for classifying a current coverage and capacity (CCO) status according to a multiplicity of performance factors for a multiplicity of mobile network cells, wherein said multiplicity of performance factors includes at least downlink coverage, uplink interference, downlink load, and downlink interference;
means for clustering said mobile network cells into cell clusters based on at least said classifying and proximity of said mobile network cells to each other;
means for identifying at least one problem cluster from among said cell clusters at least according to said classifying;
means for identifying at least one underperforming master key performance indicator (MKPI) for said at least one problem cluster; and
means for instructing said mobile network cells in said at least one problem cluster to perform at least one remedial action to address at least one of said performance factors to improve performance according to said at least one underperforming MKPI.

20. A coverage and capacity (CCO) server comprising:
a processor;
an I/O module operative to at least:
send instructions to a multiplicity of mobile network cells, and receive feedback regarding performance factors of said multiplicity of mobile network cells, wherein said multiplicity of performance factors includes at least downlink coverage, uplink interference, downlink load, and downlink interference;
a classifier to be executed by said processor and operative to classify said multiplicity of mobile network cells according to said performance factors;
a clusterer to be executed by said processor and operative to cluster said multiplicity of mobile network cells into cell clusters based on said classifying and proximity of said multiplicity of mobile network cells to each other; and
a CCO manager application to be executed by said processor and operative to:
identify a problem cluster from among said cell clusters at least according to said classifying,
identify at least one underperforming master key performance indicator (MKPI) for said problem cluster, and
instruct said multiplicity of mobile network cells in said problem cluster to perform at least one remedial action to improve said at least one underperforming MKPI.

21. A method implemented on a computing device, the method comprising:
- classifying a current coverage and capacity (CCO) status according to a multiplicity of performance factors for a multiplicity of mobile network cells;
- clustering said mobile network cells into cell clusters based on at least said classifying and proximity of said mobile network cells to each other;
- based at least on said performance factors, identifying at least one problem cluster from among said cell clusters;
- identifying at least one underperforming master key performance indicator (MKPI) for said at least one problem cluster; and
- instructing said mobile network cells in said at least one problem cluster to perform at least two remedial actions to address at least one of said performance factors to improve performance according to said at least one underperforming MKPI, wherein each of said at least two remedial actions is to be performed separately according to a schedule;
- defining a feedback window for each of said at least two remedial actions according to said schedule;
- monitoring said at least one underperforming MKPI in said mobile network cells in said at least one problem cluster in each said feedback window after performance of each of said at least two remedial actions; and
- for each said feedback window, upon determining according to said monitoring that said at least one underperforming MKPI falls below a definable back out threshold, instructing said mobile network cells in said problem cluster to back out a most recently performed remedial action from said at least two remedial actions.

22. A system implemented on a computing device comprising:
- means for classifying a current coverage and capacity (CCO) status according to a multiplicity of performance factors for a multiplicity of mobile network cells;
- means for clustering said mobile network cells into cell clusters based on at least said classifying and proximity of said mobile network cells to each other;
- means for identifying based at least on said performance factors at least one problem cluster from among said cell clusters;
- means for identifying at least one underperforming master key performance indicator (MKPI) for said at least one problem cluster; and
- means for instructing said mobile network cells in said at least one problem cluster to perform at least two remedial actions to address at least one of said performance factors to improve performance according to said at least one underperforming MKPI, wherein each of said at least two remedial actions is to be performed separately according to a schedule;
- means for defining a feedback window for each of said at least two remedial actions according to said schedule;
- means monitoring said at least one underperforming MKPI in said mobile network cells in said at least one problem cluster in each said feedback window after performance of each of said at least two remedial actions; and
- means for instructing said mobile network cells in said problem cluster to back out a most recently performed remedial action from said at least two remedial actions upon determining according to said monitoring that said MKPI falls below a definable back out threshold.

* * * * *